United States Patent [19]
Cleeton

[11] 3,945,006
[45] Mar. 16, 1976

[54] RADIO FREQUENCY CODING SYSTEM
[75] Inventor: Claud E. Cleeton, Washington, D.C.
[73] Assignee: The United States of America as represented by the Secretary of the Navy, Washington, D.C.
[22] Filed: Apr. 4, 1952
[21] Appl. No.: 280,634

[52] U.S. Cl. .............................. 343/6 R; 343/6.5 R
[51] Int. Cl.² .......................................... G01S 9/56
[58] Field of Search ......... 343/6, 6.5, 6.8, 227, 6 R, 343/6.5 R

[56] References Cited
UNITED STATES PATENTS

| | | | |
|---|---|---|---|
| 2,415,359 | 2/1947 | Loughlin | 343/6 |
| 2,444,426 | 7/1948 | Busignies | 343/6 |
| 2,515,178 | 7/1950 | Barchok | 343/6 |
| 2,531,412 | 11/1950 | Deloraine | 343/6 |
| 2,537,102 | 1/1951 | Stokes | 343/6 |
| 2,568,265 | 9/1951 | Alvarez | 343/6 |
| 2,592,777 | 4/1952 | Williams | 343/6 |
| 2,595,141 | 4/1952 | Herbst | 343/6 |

Primary Examiner—T. H. Tubbesing
Attorney, Agent, or Firm—R. S. Sciascia; Arthur L. Branning

EXEMPLARY CLAIM

2. In combination, a radar locator system, a pulse generator operable to produce pulse transmissions comprising one or more time spaced pulses occurring in any of a plurality of fixed time positions to form a plurality of different pulse code patterns which vary from pulse transmission to pulse transmission, a receiving means for receiving each of said pulse transmissions, a coder circuit in said receiving means responsive to the number and time position of said pulses to generate a reply signal having a characteristic dependent upon the pattern of said pulse transmissions, means for synchronizing the operation of said radar locator system and said pulse generator, and means for correlating the reply signals generated in said coder circuit and the echo pulses received by said radar locator system.

18 Claims, 11 Drawing Figures

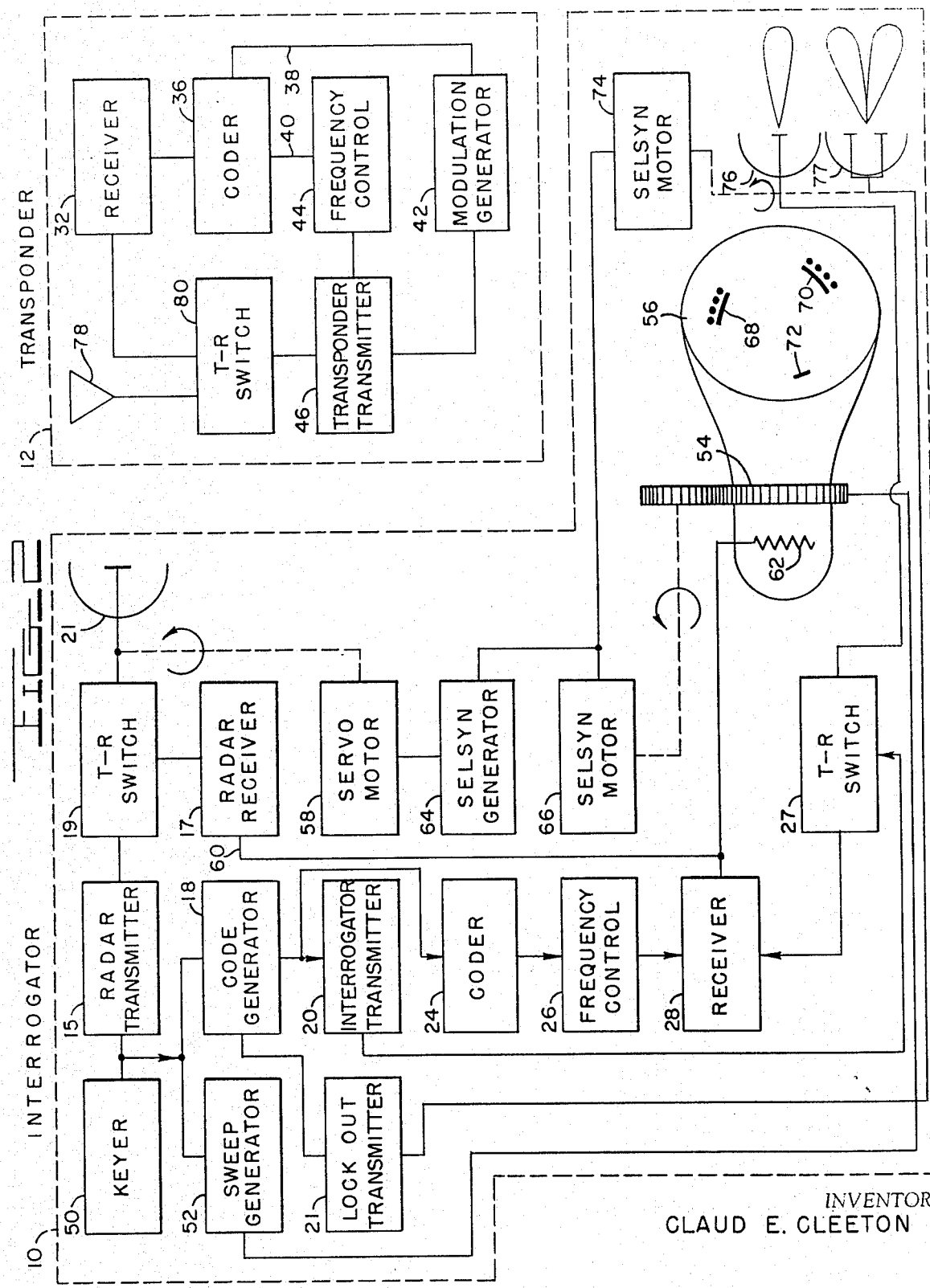

INVENTOR
CLAUD E. CLEETON

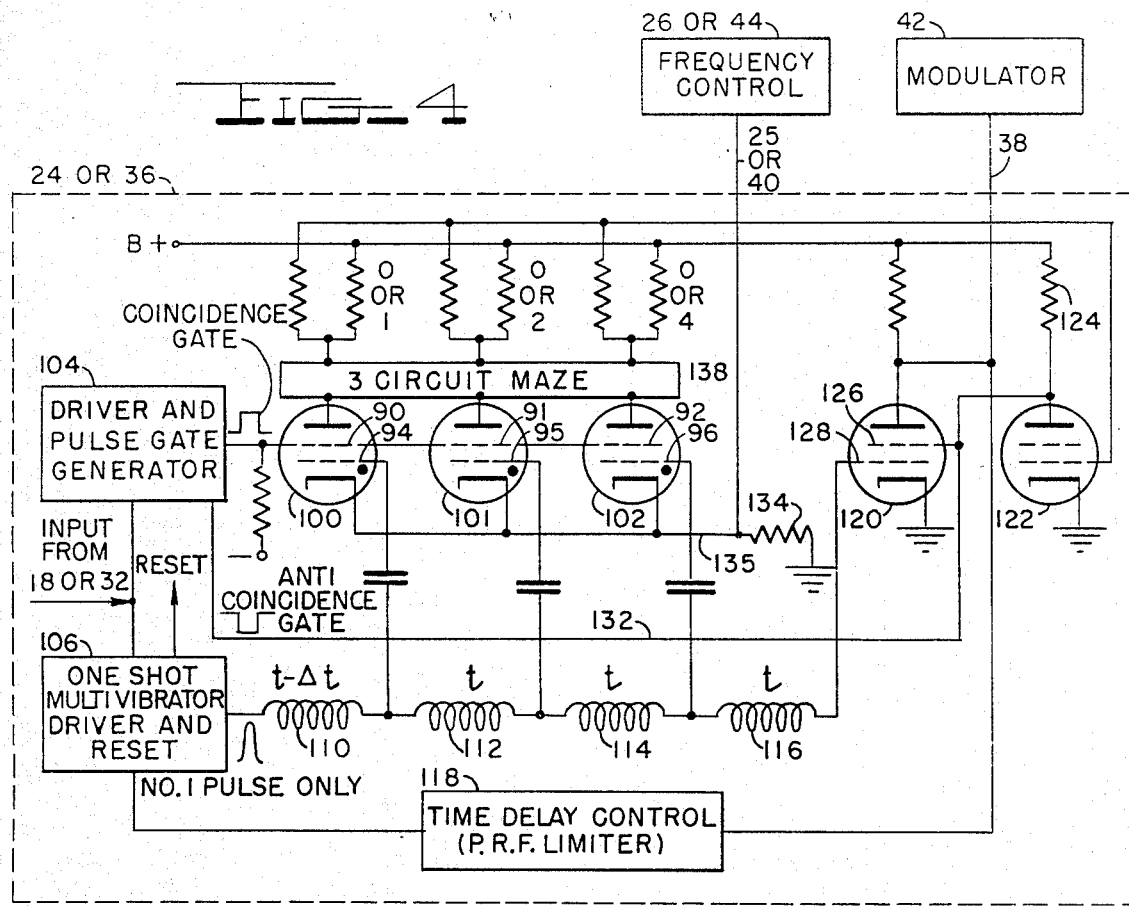
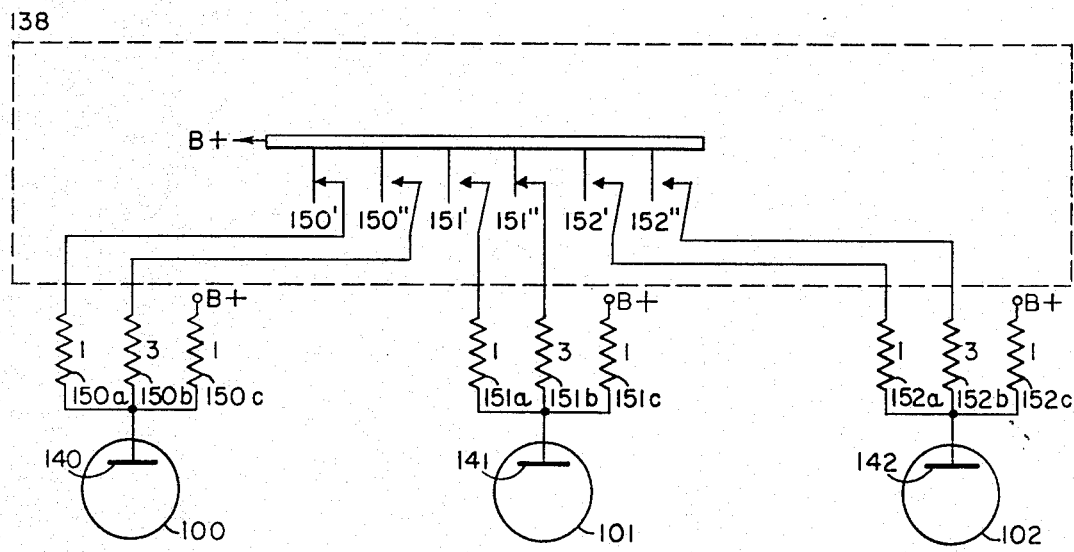

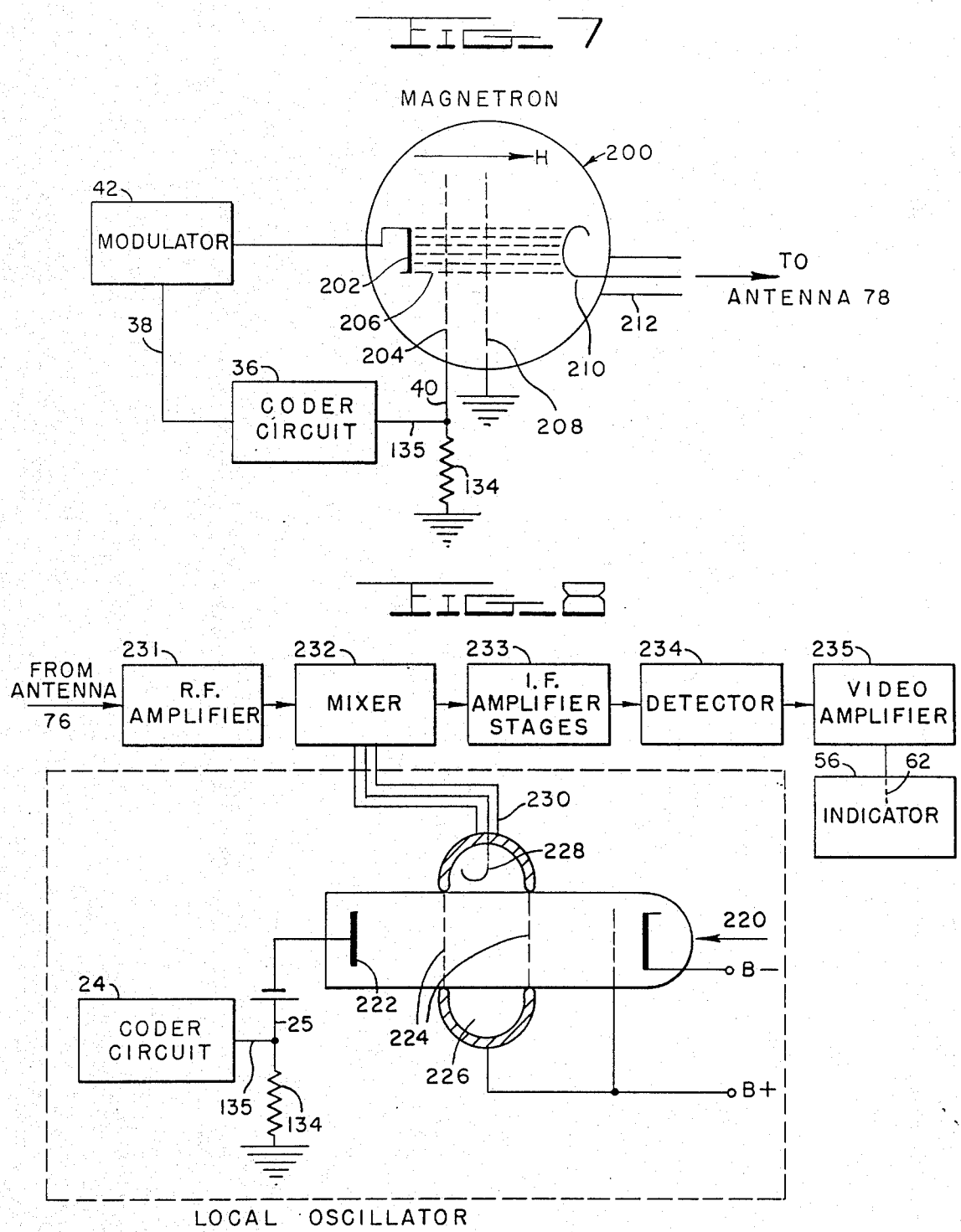

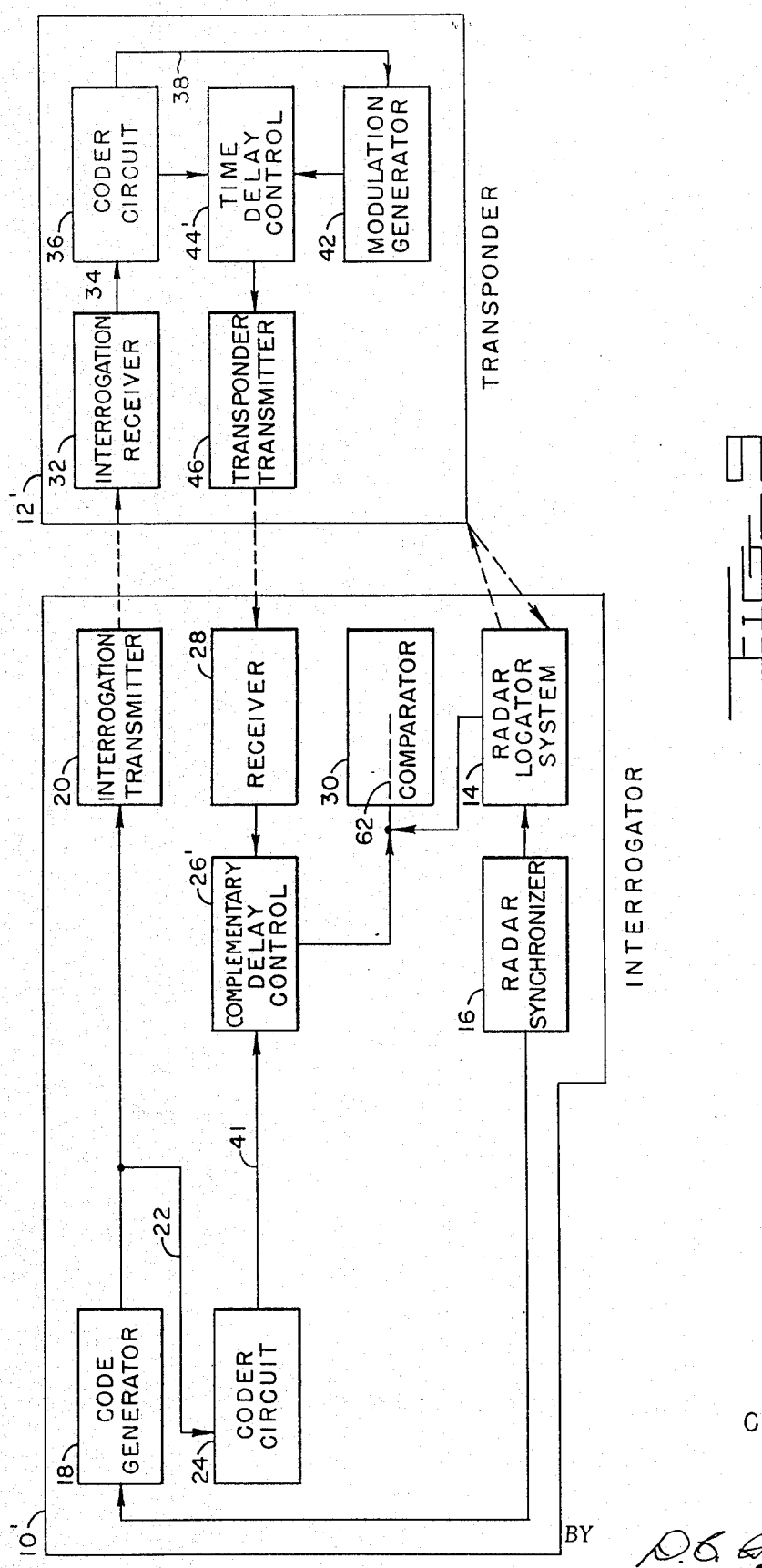

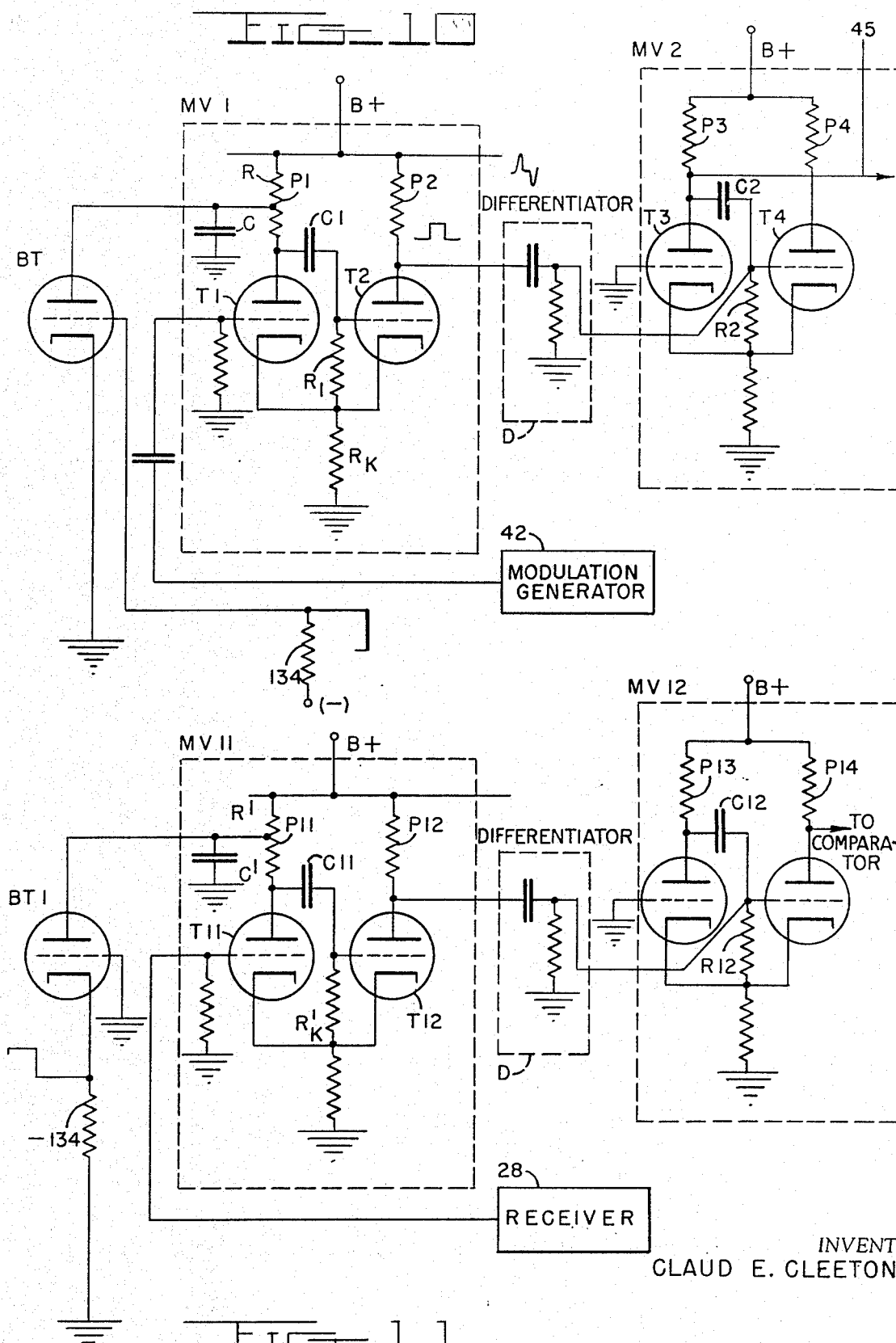

RADIO FREQUENCY CODING SYSTEM

The invention described herein may be manufactured and used by or for the Government of the United States of America for governmental purposes without the payment of any royalties thereon or therefor.

This invention relates to a pulse beacon system or the like wherein transmission of a predetermined code pattern produces a return signal the characteristics of which are at a given instant dependent on the structure of the original signal. The invention also contemplates the provision of means for randomly varying the reply signal characteristics whereby greater security may be obtained. The invention described hereinbelow is specifically adapted for use as an automatic coding system for use in interrogator-transponder systems and in a specific embodiment to the identification of friendly units from enemy units. This invention is also capable of use as an aircraft control system, a voice or code communication system, in short range navigation control and for distress signalling.

It is an exceedingly difficult problem during the course of combat to identify friendly forces from enemy forces. This problem can be resolved by the provision of a pulse-type interrogator-transponder radio-frequency system in which enemy objects are determined by eliminating friendly objects by the establishment of a one to one correspondance, by one or more space coordinates, between each radar detected object and properly coded recognition signal.

It is, accordingly, an object of this invention to provide an electronic recognition system that provides coverage at least equal to that obtained by associated radio detection devices.

It is another object to provide an electronic recognition system that supplies data at a rate equivalent to the radar detection rate.

It is a further object of the present invention to provide an electronic recognition system that provides unmistakable correlation with object-position information.

Another object of this invention is to provide an electronic recognition system that is free from being comprised.

It is another object to provide an electronic recognition system that is substantially automatic in operation.

A further object of this invention is to provide a pulse code communication system useable for identification purposes and also adaptable to perform other functions, such as emergency (distress) signalling, short range navigation, aircraft control, and communication (voice and/or code).

Other objects and features of the present invention will become apparent upon consideration of the following detailed description in connection with the accompanying drawings which illustrates certain specific embodiments of the invention. It is to be expressly understood, however, that the drawings are designed for purposes of illustration only and not as a definition of the limits of the invention, reference for the latter purpose is to be had to the appended claims.

FIG. 2 is a more detailed diagram of the system shown in FIG. 1;

Figure 6:
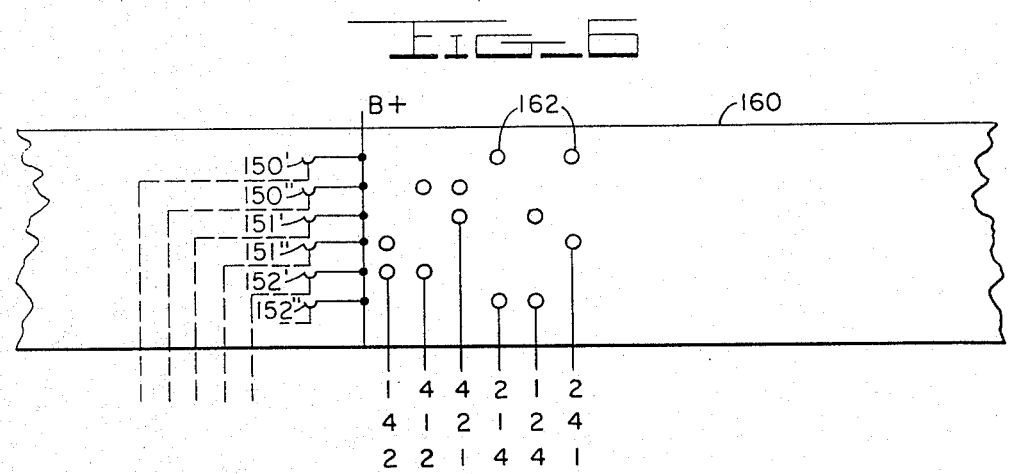
Figure 3:
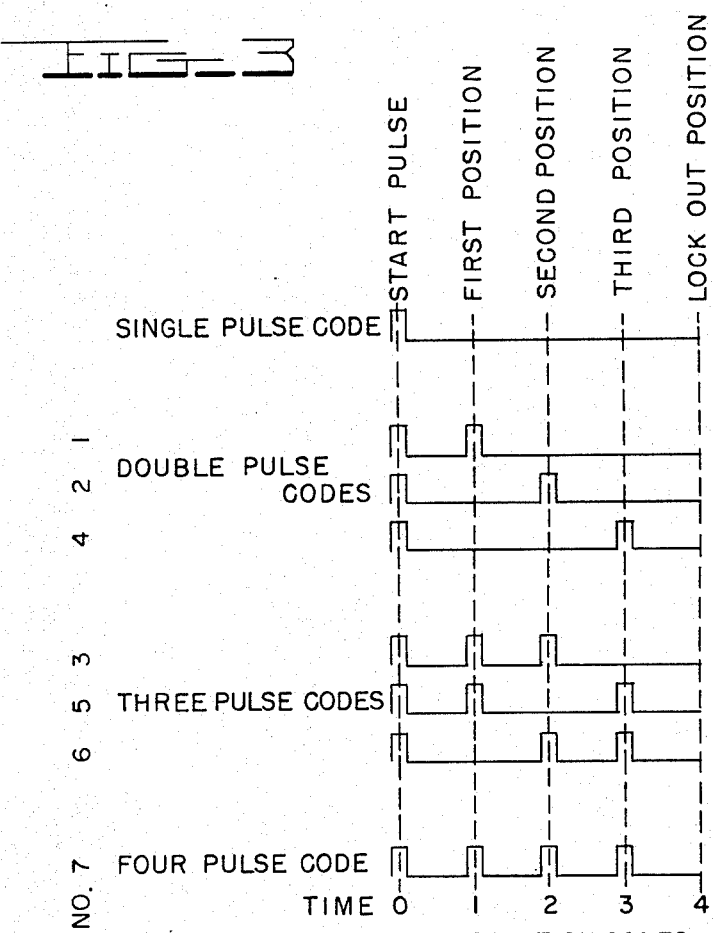

FIG. 3 graphically illustrates the seven possible codes that can be transmitted by the interrogator of the present invention;

FIG. 4 shows a simplified circuit diagram, partially in block showing an embodiment of the coder circuit used at both the interrogator and the transponder of the present invention;

FIG. 5 shows a typical three circuit maze to be used in conjunction with the apparatus of FIG. 4;

FIG. 6 shows in more detail one suitable form of the switching maze of FIG. 5;

FIG. 7 is a schematic diagram showing a typical embodiment of a frequency control means used in conjunction with the apparatus of FIG. 4;

FIG. 8 shows a typical embodiment of another frequency control means used in conjunction with the apparatus of FIG. 4;

FIG. 9 is a schematic of an alternate embodiment of my invention;

FIG. 10 is a circuit diagram of an element used in the embodiment of FIG. 9; and FIG. 11 is a circuit diagram of another element used in the embodiment of FIG. 9.

Very briefly the present invention provides in one form a pulse type interrogator transponder radio system in which friendly objects are identified on a radar screen by the use of a properly coded reply signal transmitted from friendly objects in response to the receipt of a coded interrogator signal transmitted from the radar site. In the preferred embodiment, the interrogator code is in the form of a pulse pattern which consists of a first, or reference pulse, in a first time position followed by one to three auxiliary pulses in second, third and fourth time positions. Such a pulse pattern can produce any of seven distinct plural pulse codes, as shown in FIG. 3.

When any one of the coded pulse patterns of FIG. 3 are received at the transponder, the transponder automatically replies by reradiating a return signal such as a pulse which has a coded characteristic dependent, as hereinafter described, upon the received code. In one embodiment of the present invention frequency coding is employed at the transponder wherein the transponder reply pulse may have any one of seven distinct carrier frequencies as determined by the transmitted interrogator code. Then at the interrogator, the interrogator receiver is automatically tuned in response to the transmitted interrogator code to the carrier frequency of the transponder reply code.

In addition to the above, the frequency of the interrogator transmitter may be distinct from the transponder in order to prevent radar type of operation of the identification system, and as hereinafter described the transponder codes and interrogator receiver tuning may be synchronously but randomly varied by a timing mechanism to provide for added security in the system.

Figure 1:
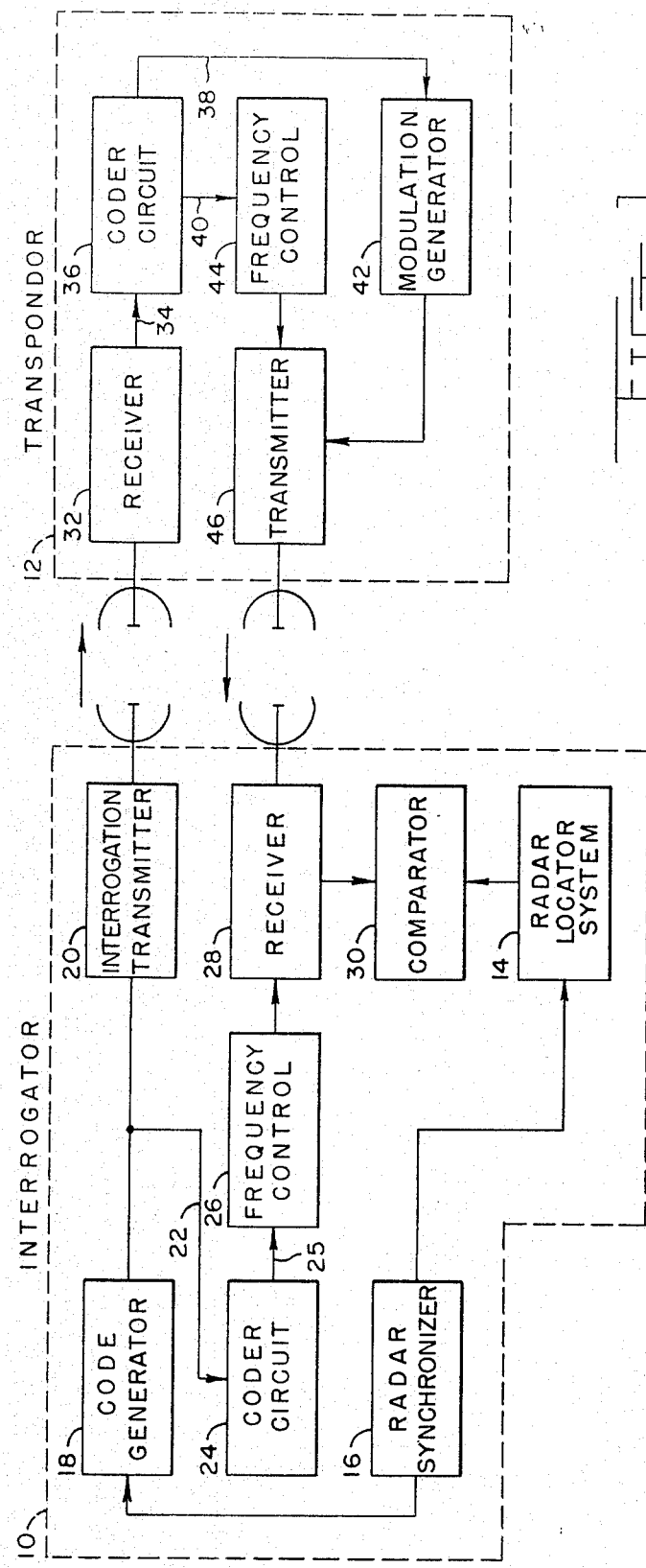
FIG. 1 is a schematic diagram showing a generalized embodiment of an interrogator-transponder system of a type envisioned in the invention used in conjunction with a radar locator system.

With reference to FIG. 1, an interrogator 10 which may be located at a reference station, mobile or immoble, and a number of transponders 12, which are located on friendly craft such as planes, ships, tanks, etc., comprise the system contained in the present invention. Interrogator 10 is provided with a radar locator system 14, which may be the type described in U.S. Pat. No. 2,537,102. A radar synchronizer 16 is provided to enable an interrogation system (to be described more fully below) to operate in synchronism with the radar system. A typical synchronizing system is included in FIG. 2 and described further below. Coupled to the synchronizer 16 is a code generator 18 designed to trigger an interrogation transmitter 20 with any of the desired codes of FIG. 3. If desired, the code generated at the generator 18 may vary from cycle to cycle in a random manner. Examples of a typical code generator that may be used in conjunction with the present invention is found in U.S. Pat. No. 2,567,944 to Ernst Krause and Applicant. The interrogation pulses are preferably directionally transmitted via the transmitter 20 through a complete circle in synchronism with the transmitted radar pulses. A pulse transmission line 22 couples a portion of the signal forming the interrogator code to a coder circuit 24, a typical embodiment of which is shown in detail in FIG. 4. This coder circuit is designed to generate a voltage signal that is dependent upon the code transmitted. The signal developed by coder circuit 24 is coupled via line 25 to a frequency control circuit 26. The latter controls the tuning of receiver 28 to tune the same to the proper frequency for receipt of a coded reply generated at the transponder 12. A comparator 30, such as the range indicator of the radar, is coupled to the receiver 28 and the receiver of radar system 14 in order to correlate and received coded transponder signals with the echoed pulses detected by the radar.

A transponder 12 is located on all friendly craft. Each transponder comprises a receiver 32 tuned to the interrogation transmitter 20. The pulses transmitted by interrogation transmitter 20 are detected by the receiver 32 and applied via transmission line 34 to a coder circuit 36. This latter coder circuit is identical to the coder circuit 24 contained in the interrogator 10. Lines 38 and 40 couple the coder circuit 36 to a modulation generator 42 and a frequency control circuit 44, respectively. These latter two elements determine the time and operating frequency of transmitter 46. Thus, pulses transmitted by the latter are dependent upon the nature of the interrogation code transmitted for their operating frequency. Since the tuning of receiver 28 at the interrogator is simultaneously dependent upon the same interrogation code, receiver 28 is tuned to the frequency of transmitter 46 no matter how many times the frequency is varied in response to the changes in the interrogation code used. Since only friendly craft are provided with coder circuit 36, only friendly craft are able to initiate response at the proper frequencies with any degree of consistency. In practice the number of interrogator codes is preferably made high enough to avoid compromise by an enemy by simple monitoring and yet low enough to enable the size of the transponder unit 12 to be small enough to be carried on all friendly craft including small planes.

In addition, provision may be made for randomly changing the operation of the coder circuits 24 and 36 so that different transponder code frequencies are transmitted in response to identical interrogation codes transmitted at different times.

Now with special reference to FIG. 2, more of the details of the system of FIG. 1 will be further explained. In the radar detector system, a keyer circuit 50, which may be any suitable free running signal source, simultaneously energizes the transmitter 15 of the radar locator system 14, and a sweep generator 52. The latter energizes the deflection coils within a yoke 54 surrounding the neck of a cathode ray tube 56. The radar locator system also comprises radar receiver 17, a T-R switch 19 and a rotating antenna 21 which is driven by servo motor 58. A line 60 couples the radar pulses received by radar receiver 17 to the control grid 62 of cathode ray tube 56. A selsyn generator 64 coupled to motor 58 and driven thereby provides the energy to rotate selsyn motor 66 which is mechanically coupled to yoke 54 via suitable gearing, thereby causing the yoke to rotate at the same speed as antenna 21 and in phase therewith.

Exploratory pulses of radio frequency energy are directionally transmitted into space via antenna 21 and the region about the detecting station is scanned in azimuth by slowly rotating the antenna. Portions of this energy are reflected by any targets within the range of the system, and as a result, echo pulses are received back at the site of the original transmission. The azimuthal bearing and range of each target causing these echoes are determined by utilizing said echoes to intensity modulate the electron beam of the oscilloscope 56, which is provided with a radial sweep generated by sweep generator 52 synchronized with the transmission of the exploratory pulses by the keyer circuit 50. The sweep is rotated about the center of the screen in synchronism with the scanning of antenna 21 by means of the selsyn generator 64, selsyn motor 66, and the servo motor 58, respectively.

The instant a radar pulse is transmitted, the oscilloscope sweep begins to move outwardly from the center of the screen of oscilloscope 56, corresponding to the location of the interrogator, along a radius corresponding to the instantaneous azimuthal bearing of antenna 21. Upon encountering a reflecting object in space, the pulse is reflected back toward the antenna. Thus the pulse echo picked up by antenna 21 is detected in receiver 17 and applied to the control grid 62, thereby causing an intensified spot to appear on the oscilloscope screen. The antenna, for all practical purposes, is still pointing in the same direction when the echo is received, because of the high velocity of radio waves compared to the speed of rotation of the antenna.

The cycle of operations described above is repeated as long as the particular reflecting object remains within a sufficiently intense portion of the rotating antenna pattern to result in echoes capable of detection without altering the receiver sensitivity. Since this portion of the antenna pattern is generally several degrees wide, the echo indication seen on the oscilloscope screen is generally a small arc rather than a spot. As the antenna rotates, additional targets are detected until eventually the oscilloscope displays echoes from all targets within the range of the system. Arcs 68, 70 and 72 indicate the location of such targets on the oscilloscope screen.

As previously mentioned, one of the primary objectives of the present invention is to provide a novel and reliable electronic recognition system. As is conventional in most recognition systems the system of the present invention comprises two major units, (1) an interrogator unit located at the radar site, and (2) a transponder unit located on board all friendly craft. The interrogator unit includes a transmitter 20 which preferably operates at a frequency distinct from that of the radar system. The output of the interrogator transmitter is fed to an antenna 76 through a T-R switch 27. The antenna 76 is preferably directional and is rotated in synchronism with the radar antenna 21 by means of a selsyn motor 74 connected to the main servo loop which drives the antenna and deflection coils of the radar system. These connections correlate in azimuth the position of friendly and unfriendly objects. To correlate the radar echoes in range with friendly response pulses, the interrogator transmitter 20 is keyed in synchronism with the radar transmitter 15 by connecting the former to the radar keyer 50 through the code generator 18.

The code generator 18 as previously mentioned may be typically a pulse generator of the type disclosed in the Cleeton and Krause patent supra, or alternatively it may take other forms such as that illustrated in FIG. 1 of the U.S. Pat. No. to Smith 2,403,561 issued July 9, 1946. In any event the code generator 18 is arranged so that each time the radar transmitter is pulsed, code generator 18 causes the interrogator transmitter to simultaneously emit one of the pulse patterns depicted in FIG. 3. As specifically disclosed by this figure the coded pulse pattern comprises a start pulse which is always transmitted followed by one to three other time spaced pulses occurring in any of three other fixed time positions. Of course the number of possible codes depend upon the number of pulses and time positions employed. In the case of a four pulse, four time position pattern as herein illustrated 8 possible codes may be had. A single pulse however is seldom used because of its similarity to noise. Thus with the pattern illustrated seven plural pulse codes may be obtained. It is obvious that if more codes are desired more code pulses and time positions may be employed. From the standpoint of transmitter power consideration, however, it is usually desirable to employ a code which comprises a low number of pulses of say ¼ to ½ microsecond duration all occurring in a small time interval, say 5 microseconds.

To tune the interrogator receiver 29 to the proper reply frequency, a coder circuit 24, later described in detail, is added to the system. Coder 24, as will later be made apparent, is a circuit which derives from the transmitted code a direct current control voltage, the amplitude of which varies with the number of time positions of the pulses of the transmitted pulse pattern. This control voltage is used to actuate a receiver frequency control circuit 26, such as the local oscillator thereof to tune the receiver to the proper reply channel frequency.

At the transponder unit the transmitted pulse pattern is picked up on an antenna 78, which is preferably omnidirectional, and then passed through a T-R switch 80 to a suitable receiver 32. In the receiver the received pulses are amplified and detected and passed on to a coder circuit 36. Coder circuit 36 is essentially identical to coder 24 at the interrogator. The control voltage developed here is then transmitted via line 40 to a frequency control means 44 to govern the frequency associated with the transponder transmitter 46 thereby establishing the correct reply frequency for the transponder. Coder 36 also provides a delayed pulse on lead 38 which keys transmitter 46 through a suitable modulator 42 after transmitter 46 has had time to respond to the action of the frequency control circuit 44.

A magnetron oscillator, as latter described, containing a grid the bias of which is determined by the voltage generated by coder circuit 36 and which in turn determines the resonant frequency of the cavity, is suitable for use as the transponder transmitter.

During operations then the response pulses detected by the interrogator receiver 28 are applied together with the radar echoes to the intensity grid 62 of the indicator 56. Since some delay is experienced by the interrogator pulses in being handled by the transponder, the reply signals appear on the radar scope slightly delayed in time with respect to the echoes which emanate from the friendly craft which carries the transponder equipment of FIG. 2. A typical presentation appearing on the viewing screen is shown in FIG. 2. Here arcs 68 and 70 illustrate typical echoes from friendly objects with the associated transponder reply signals delayed slightly in range while arc 72 indicates an unfriendly object not equipped with a transponder.

A further feature of the present invention rests in the possiblity of utilizing a "lock out" pulse transmitted as indicated in FIG. 3 in a fifth time position of the pulse pattern on a null antenna pattern aligned with the main lobe of the interrogator antenna 76. To this end a "lock out" pulse is obtained from a separate (fifth time position) channel in the code generator and applied to a separate "lock out" transmitter 21, the output of which is fed to a suitable antenna 77. The latter is rotated in synchronism with antenna 76 and has a pair of divergent lobes with the null therebetween being aligned with the main lobe of antenna 76.

The additional pulse transmitted as a lockout pulse prevents responses by transponders located on the edges of the main interrogator antenna pattern. Transmission of the interrogation code on a normal single lobe antenna pattern causes, as later described, triggering of the transponder only if a pulse is not received in the "lock out" position. If this pulse is transmitted on a null pattern aligned with the central lobe, triggering occurs only over a narrow arc determined by the null pattern. Transponders will reply to normal interrogation using a conventional antenna where broader response arcs are suitable. This technique enables a small arc to be obtained on a radar display of the plan position indicator type with a small antenna but without going to extremely high frequencies and also decreases the possibility of secondary lobe triggering and makes possible an increase in traffic capacity due to less triggering of transponders. This beam-sharpening system as developed at the Naval Research Laboratory by C. V. Parker and L. L. Cazenavette.

FIG. 4 illustrates a typical embodiment of a circuit useful as either of the coders 24 or 36. It is noted that the circuits drawn serve merely to illustrate the general principles involved and are not necessarily the best choice as to economy of tubes, power drain, wide range operation and performance of functions.

The circuit essentially comprises three gas coincidence tubes 100, 101 and 102, which fire upon reception of pulses in the second, third and fourth time positions, respectively. This is accomplished by the generation of positive gates of one microsecond width by each pulse received by the driver and pulses gate generator 104. These positive gates are applied to the shield grids 90, 91 and 92 of tubes 100, 101 and 102 in parallel, respectively, overcoming a fixed bias.

The reference pulse or first pulse of the generated code is used to drive a one-shot multivibrator 106, which supplies a pulse in sequence to control grids 94, 95 and 96. This pulse is passed through suitable delay lines 110, 112 and 114 before being applied to the respective control grids. The time interval between the arrival of the pulse from the multivibrator 106 to each successive control grid equals the time interval between the individual pulse positions. Thus, the multivibrator pulse arrives at control grid 94 at a time corresponding to the middle of the gate generated by the pulse in the first code position following the reference pulse; at control grid 95 at a time corresponding to the middle of the gate generated by the pulse in the second code position and at control grid 96 at a time corresponding to the middle of the gate generated by the pulse in the third code position. The period of the multivibrator 106 is so adjusted that it has an inactive period exceeding the time necessary for the code to be received. The length of time needed to reset multivibrator 106 is determined by a time delay control or pulse repetition frequency limiter circuit 118. At the transponder coincidence tubes 100, 101 and 102 are kept in their conduction states by delay 118 until some time after the reply has had time to be transmitted, while at the interrogator these tubes are held conducting until the reply signal has been received. Then they may be reset by either driving the cathodes positive or the plates to zero potential. The cathodes may be driven positive by coupling the reset lead of multivibrator 106 thereto.

The firing of the transponder occurs at a time corresponding to the arrival of the multivibrator 106 pulse via delay lines 110, 112, 114 and 116 to the control grid 128 of tube 120, unless tube 120 is blocked. This blocking occurs under one of two conditions. First, if none of the coincident tubes 100, 101 or 102 fires, corresponding to the reception of a single pulse in the first, second or third code positions following the reference pulse, tube 122 remains conductive by virtue of the connection of its grid to the plates of the gas tubes with its plate potential low as a result of the drop through plate resistor 124 which supplies the screen grid 126 of tube 120. The potentials are so adjusted that there is no output from tube 120. If one or more coincidence tubes conduct, tube 122 is blocked by the reduced grid voltage and tube 120 will pass pulses applied to its control grid 128 on to a modulator assembly 42 via line 38 thereby resulting in transponder signals being transmitted. Secondly, a negative anti-coincidence gate is generated by gate generator 104 in response to each received pulse and applied via conductor 132 to the screen grid 126 so that no output occurs from the tube 120 when this gate is present. It is seen then that if a lockout pulse is transmitted, and anti-coincidence gate can be made to arrive at grid 126 coincidental with the time of arrival of the delayed multivibrator 106 pulse to control grid 128 of tube 120 preventing transponder transmission.

The delay frequency is established in the following manner. The respective plate resistors of tubes 100, 101 and 102, when these tubes are conducting, permit the passage of currents of 1, 2 and 4 units via lead 135 through common cathode resistor 134, the impedance of which is small compared to that of the plate resistors. The potential drop across resistor 134 takes on values dependent on what combination of tubes are fired, the latter being in turn dependent on the interrogation pulses received. The number of potential units corresponding to each interrogation code is shown in the left hand column on the left of FIG. 3.

The potential across resistor 134 is applied to a frequency control circuit 26 or 44 which contains an electronically controlled oscillator the frequency of which is a linear function of the voltage applied, and which is to be described more fully below.

For added security, the coder output at the interrogator and transponder for a given code can be varied at random. To do so, a 3 circuit maze 138 is utilized. This circuit switches the plate resistors of tubes 100, 101 and 102 so that currents of 1, 2 and 4 units are distributed at random among the tubes. A typical embodiment of a 3 circuit maze is shown in FIG. 5.

In this figure, plates 140, 141 and 142, associated with tubes 100, 101 ans 102, respectively, each have a bank of three parallel resistors 150a, 150b, 150c, 151a, 151b, 151c, and 152a, 152b and 152c, respectively, connected to the corresponding plates. These resistors have resistances such as to pass currents of 1, 3 and 1 units, respectively. The 1 current unit resistors 150c, 151c and 152c are connected directly to the anode of a B battery normally coupled to the plates. The other two resistors from each resistor bank are coupled to two switches which make or break parallel circuits leading to the anode of the B battery. Altogether, there are switches 150' and 150" associated with resistors 150a and 150b of tube 100, switches 151' and 151" associated with resistors 151a and 151b of tube 101 and switches 152' and 152" associated with resistors 152a and 152b of tube 102, respectively.

The maze is so connected that only one of the "single prime" switches is closed as is one "double prime" coupled to a tube different from that coupled to the closed "single prime" switch.

In the circuit depicted in FIG. 5, tube 100, when fired, provides 2 units of current across the common cathode resistor 134, one from the plate resistor 150c connected directly with the anode of the B voltage supply and the other unit from the plate resistor 150a which forms a parallel plate circuit due to the fact that switch 150' is closed. Tube 101, when fired, provides 4 units of current across common cathode resistor 134, one unit due to the output through plate resistor 151c and three units via plate resistor 151b and closed switch 151". Tube 102, when fired, provides only one unit of current through resistor 152c because both switches 152' and 152" are open. Provision can be made to change the settings of the switches in maze 138 either manually or automatically.

A typical embodiment of a device which automatically changes the settings of the switches in the maze 138 is shown in FIG. 6. In this embodiment, the switches 150' etc. are opened and closed by a perforated tape 160 containing perforations 162 arranged in random manner so that upon any setting of the tape, an $a$ resistor is coupled to one tube, a $b$ resistor to a second tube and no resistor coupled to the third tube. By changing the position of the tape, a different permutation of tube outputs can be obtained. The tape position can be changed automatically at desired intervals by some mechanism the timing of which may be controlled by a chronometer. Naturally, the greater the number of interrogation codes used, the less frequently are the codes required to be changed to avoid decipherment. In any event the tapes at both the interrogator and transponder must be very carefully synchronized. Such synchronization can be obtained by the use of carefully matched clock driven mechanisms used to move the tapes at both locations.

While the embodiment of the coder circuits illustrated shows three tubes and a three circuit maze, it is understood that the addition of more tubes and more resistors in parallel in the respective plate circuits multiply the number of permutations possible.

In FIG. 7, a block diagram of a typical embodiment of a frequency control citcuit 44 used to control the transmission frequency of transponder transmitter 46 (FIGS. 1 and 2) is shown. This embodiment utilizes a gridded magnetron 200 for electron-beam tuning in accordance with the principles disclosed on page 592 of the First Edition of "Microwave Magnetrons" by Collins, which is Volume 6 of the Radiation Laboratory Series published in 1948 by the McGraw-Hill Book Co., Inc. In accordance with this teaching, the voltage pulse obtained from coder circuit 36 is suppled to the modulator 42 and used to drive cathode 202 of magnetron 200 with large negative pulses, thereby rendering the magnetron operative. The freqency control voltage produced across resistor 134 by coder circuit 36 is applied via line 40 to a grid 204 of the magnetron thereby controlling the intensity of the electron beam. When the voltage across resistor 134 is changed, the grid bias is changed and therefore, so is the intensity of the electron beam. This change is intensity of the electron beam results in a change of the resonant frequency of the resonant cavity of magnetron 200. A screen grid 208 is provided at anode potential to accelerate the flow of the electron beam. A magnetic field H is provided parallel to the axis of the beam by a permanent magnet (not shown) in order to focus the beam on the collector loop 210. A line 212 carries the pulses to antenna 78.

To tune receiver 28 contained at the interrogater 10 of FIGS. 1 and 2, a reflex klystron 220 is employed embodying the principle described on page 27 of the First Edition of "Klystrons and Microwave Triodes" by Hamilton et al, which is Volume 7 of the Radiation Laboratory Series published by the McGraw-Hill Publishing Co., Inc. In this embodiment as shown in FIG. 8, the klystron is used as a local oscillator in the receiver system. The voltage generated across common cathode resistor 134 by coder circuit 24 is used to modify the negative potential or repeller plate 222 of reflex klystron 220 by means of line 25 which couples resistor 134 to repeller 222. Since the transit time of electrons from grids 224 to repeller 222 and back to the grids is a function of the repeller potential, the frequency of resonator cavity 226 is modified by a change in potential of the repeller. A pick-up loop 228 and a coaxial line 230 couple the klystron to a mixer 232 where the local oscillator output from the klystron is mixed with the output of r.f. amplifier 231 coupled to antenna 76.

The intermediate frequency output of the mixer 232 is amplified in the i.f. amplifier stages 233, passed through a detector 234 and video amplifier 235 in a conventional manner and then fed to the control grid 62 of the cathode ray indicator 56. Thus, if antenna 76 and r.f. amplifier 231 are tuned broadly to receive a frequency band ranging from say 3000 to 3070 megacycles per second and the i.f. strips are tuned to 30 megacycles, a reflex klystron tunable between 2970 and 3040 megacycles in say, seven distinct steps corresponding to the seven possible codes will be adjusted to the proper local oscillator frequency to mix with the proper r.f. signal received to provide a heterodyne beat of 30 megacycles per second, the only frequency accepted by the i.f. strips. Other frequencies received by the antenna are mixed with the klystron local oscillator output to produce different heterodyne outputs that the i.f. strip rejects. Therefore, the indicator 56 indicates only those response signals that are transmitted on the proper frequencies selected by coder circuits 24 and 36.

As shown in FIG. 9, an alternate embodiment of my identification system envisions the use of time delay coding at the transponder as an alternate to frequency coding. In this embodiment a variable time delay circuit 26' is employed at the interrogator 10' and another variable time delay circuit 44' is employed at each transponder 12'. The time delays generated in these circuits are dependent in their action on the voltage developed across cathode resistor 134 of coder circuits 24 or 36 (shown in detail in FIG. 4). In this embodiment, the interrogator code received by the transponder operates through the coder circuit 36 to insert a variable time delay of the reply pulse, the time delay varying in dependency upon the structure of the transmitted code. At the interrogator the reply pulse is subjected to a further delay, said further delay also being a function of the transmitted interrogator pulse pattern. The two delays are such that the signal eventually applied to the radar scope (comparator 30) is always delayed by constant amount with respect to the echo signal produced by the craft on which the equipment is located. In other words the local delay generated at the interrogator 10' is a complementary delay.

As before, interrogator 10' is provided with a radar locator system 14, radar synchronizer 16, code generator 18, interrogation transmitter 20, coder circuit 24, receiver 28, and comparator 30, similar to those provided in the embodiment of FIGS. 1 and 2. A complementary time delay control circuit 26' is controlled by the coder circuit 24 and inserts a complement to the delay insert caused by the action of coder circuit 36 on the time delay control circuit 44' at the transponder 12'.

In the embodiment of FIG. 9, each friendly target is equipped with a transponder 12' that varies slightly from the transponders present in the embodiment of FIGS. 1 and 2 in that the voltage generated across the common cathode resistor 134 (FIG. 4) of coder circuit 36 is coupled to a time delay control circuit 44' in lieu of frequency control 44. The amount of delay caused in circuit 44' is a function of the voltage generated across cathode resistor 134. Time delay control circuit 44' is coupled between the modulation generator 42 and the transponder transmitter 46 in order to control the time of operation of the transmitter 46.

The code to be transmitted by the interrogation transmitter 20 is also fed directly via line 22 to a coder circuit 24 which is identical in its operation to that of its counterpart in the first embodiment. The coded output from coder circuit 24 is used to control the delay added by circuit 26'.

The voltage generated across the common cathode resistor of coder circuit 24 is equal to that generated in coder circuit 36 and controls the amount of delay caused by the complementary delay control circuit 26' in such a manner that the total delay inserted in the reply signal by units 44' and 26' is constant. Thus an arc corresponding to a radar echo appearing on a comparator 30 will be accompanied by a fixed delayed identification signal due to the delayed receipt of the transponder pulse from a friendly target equipped with a transponder 12', and an arc from a hostile target will not be accompanied by a transponder signal in the manner displayed by the first embodiment.

Attention is invited to FIG. 10 for an embodiment of a time delay circuit typical of that indicated by reference number 44' in the transponder 12' shown in FIG. 9. The time delay circuits comprise a pair of multivibrators MV1 and MV2 coupled in cascade by a differentiating circuit D. The first multivibrator MV1 (which is the controllable delay unit) comprises vacuum tubes T1 and T2, a capacitor C1 to provide coupling between the plate of T1 and the grid of T2, a grid leak resistor R1 coupled to C1 to provide a leak path for capacitor C1, plate resistors P1 and P2 across which plate voltages are supplied to T1 and T2 respectively and a common cathode resistor $R_k$ coupled between the cathodes of tubes T1 and T2 and ground, thereby providing a ground leak path from the cathodes. The tubes are so biased that T2 is conductive in its normal state, thereby providing a positive cathode bias across $R_k$ which renders tube T1 non-conducting. The grid of T1 is coupled to the modulation generator 42. Upon receipt at the grid of tube T1 of a pulse from modulation generator 42 coincident with the firing of the transponder 12', current is caused to flow in the plate circuit of T1, thereby reducing the plate voltage of T1. Simultaneously, C1 begins to discharge through T1 and R1 cutting off tube T2, for a period of time which is both a function of the time constant of the R1-C1 coupling and of the average plate potential of T1. Since the time constant is fixed, the other parameter, that is the average plate voltage of T1, can be employed to regulate the non-conducting interval of T2.

To accomplish this, a bleeder tube BT comprising a cathode, grid and plate is coupled to the plate of tube T1 through an integrator network comprising a resistance R and capacitance C in order to control the time necessary for multivibrator MV1 to return from its excited state to its normal state. This bleeder tube is biased negative so that it is normally non-conducting. Common cathode resistor 134 of a coder circuit 36 is connected to the grid of BT whereby the bias and thus the current drawn by BT is a function of the voltage developed by the coder circuit. Since the coder circuit is capable of generating anywhere from 0 to 7 units of voltage across the cathode resistor 134, the bias applied to tube BT can have any of 0 to 7 units value of bias. With no signal developed across resistor 134, tube BT draws a minimum amount of current through the integrator R-C in the plate circuit of T1 and therefore the average plate current of T1 is at its highest value. This means that in the unstable state of the multivibrator, tube T2 will be held non-conducting for its greatest period of time. Expressed otherwise, tube T2 will be held nonconducting for 7 units of time. As the voltage developed across resistor 134 increases positively unit by unit, tube BT draws more current through the integrator R-C, thereby decreasing the plate voltage of tube T1 and shortening the non-conducting period of tube T2 in unit intervals.

The leading and trailing edges of the output pulses are differentiated in a capacitance-resistance differentiator D. The differentiated pulses are then applied to the grid of vacuum tube T4 of a second one-shot multivibrator MV2, which comprises normally conducting vacuum tube T4, normally cut off vacuum tube T3, capacitor C2 coupling the plate of T3 and the grid of T4, grid leak resistor R2 providing a discharge path for C2, and plate resistor P3 and P4 to provide plate voltages to T3 and T4 respectively. The positive pulses produced by differentiator D due to the leading edge of the pulse output of MV1 has no effect on the output of MV2 when it is applied at the grid of T4 because T4 conduits in the normal state. However, when the negative pulse produced by the differentiator D and corresponding to the trailing edge of the output pulse of MV1 is applied to the grid of T4, T4 is biased below cut off and T3 rendered conductive. A voltage pulse is produced at the plates of both T3 and T4, the duration of which is determined by the time constant of the resistance-capacitance coupling R2-C2.

The output from MV2 is a square shaped pulse initiated at a time interval following receipt of the pulse generated by the modulation generator 42 that is a function of the voltage generated across the common cathode resistor 134 of the coder circuit. This pulse output is applied to carrier line 45 which leads to the transponder transmitter 46 at the transponder 12'.

A typical complementary time delay circuit such as depicted by reference number 26' is shown in FIG. 11. This circuit is substantially identical to that of FIG. 10 except that the common cathode resistor of the coder is located in the cathode circuit of the bleeder tube BT1. With no coder voltage developed across cathode resistor 134, tube BT1 draws maximum current thereby reducing the average plate voltage of tube T11 of multivibrator MV11 to a minimum. This means that the delay generated at MV11 is also a minimum. Conversely as the voltage across resistor 134 increases from 0 to 1 unit, for example, then the delay generated at multivibrator MV11 increases 1 unit and so on.

Thus in operation, as the code generator 18 of the FIG. 9 embodiment sets up a code at the interrogator, code circuit 24 develops a voltage which controls the delay generated at delay circuit 26' in direct proportion to the unit value of the coder output. At the receiver, delay circuit 44' generates in response to the coder circuit 36 a delay which is inversely proportional to the unit value of the coder output voltage. The result is that the sum of the two delays is constant and the proper response for any coded interrogator signal appears at a fixed delay following the echo.

While I have shown and described only certain specific embodiments of the present invention it must be understood that I am fully aware that many modifications may be made therein without departing from the spirit of the invention. For example, the transponder and interrogator frequency tuning methods shown in connection with FIGS. 1 and 2 are intended to be exemplary only and that other systems may be used in keeping with the broader aspects of this invention. Therefore this invention is not to be restricted except insofar as the spirit of the instant disclosure indicates.

What is claimed is:

1. In combination, a pulse generator operable to produce pulses transmissions comprising one or more time spaced pulses occurring in any of a plurality of fixed time positions to form a plurality of different pulse code patterns which vary from pulse transmission to pulse transmission, a receiving means for receiving each of said pulse transmissions, and a coder circuit in said receiving means responsive to the number and time position of said pulses to generate a reply signal having a characteristic dependent upon the pattern of said pulse transmissions.

2. In combination, a radar locator system, a pulse generator operable to produce pulse transmissions comprising one or more time spaced pulses occurring in any of a plurality of fixed time positions to form a plurality of different pulse code patterns which vary from pulse transmission to pulse transmission, a receiving means for receiving each of said pulse transmissions, a coder circuit in said receiving means responsive to the number and time position of said pulses to generate a reply signal having a characteristic dependent upon the pattern of said pulse transmissions, means for synchronizing the operation of said radar locator system and said pulse generator, and means for correlating the reply signals generated in said coder circuit and the echo pulses received by said radar locator system.

3. In combination, a first pulse transmission means for producing a plurality of different code patterns which patterns vary transmission to transmission, a first coder circuit coupled to said transmission means and adapted to generate a coded signal dependent upon pulse signals transmitted by said transmission means, a receiving means tuned to said first transmission means to receive each of the transmitted code patterns, a second coder circuit coupled to said receiving means and adapted to generate in response to the energy received from the first transmission means a coded signal identical to that generated by said first coder circuit, a second transmission means coupled to said second coder circuit and adapted to transmit the specific coded signal generated by said second coder circuit.

4. In combination, a first pulse transmission means, a first coder circuit coupled to said transmission means and adapted to generate a coded signal dependent upon pulse signals transmitted by said transmission means, a first receiving means tuned to said first transmission means, a second coder circuit coupled to said first receiving means and adapted to generate in response to the energy received from the first transmission means a coded signal identical to that generated by said first coder circuit, a second transmission means coupled to said second coder circuit and adapted to transmit the specific coded signal generated by said second coder circuit, a second receiving means tuned to said second transmission means, and a comparing means coupled to the second receiving means and the first coder circuit for comparing the coded signals received by said second receiving means and those generated by said first coder circuit.

5. In combination, a pulse generator operable to produce pulse transmissions comprising one or more time spaced pulses occurring in any of a plurality of fixed time positions to form a plurality of differenti pulse code patterns, receiving means for receiving said pulse transmissions, and a coder circuit in said receiving means responsive to the number and time position of said pulses to generate a reply signal having a frequency dependent upon the pattern of said pulse transmissions.

6. In combination, a pulse generator operable to produce pulse transmissions comprising one or more time spaced pulses occurring in any of a plurality of fixed time positions to form a plurality of different pulse code patterns, receiving means for receiving said pulse transmissions, and a coder circuit in said receiving means responsive to the number and time position of said pulses to generate a reply signal having a time delay dependent upon the pattern of said pulse transmissions.

7. In combination, a radar locator system, a pulse generator operable to produce pulse transmisions comprising one or more time spaced pulses occurring in any of a plurality of fixed time positions to form a plurality of different pulse code patterns, receiving means for receiving said pulse transmissions, a coder circuit in said receiving means responsive to the number and time position of said pulses to generate a reply signal having a frequency dependent upon the pattern of said pulse transmissions, means for synchronizing the operation of said radar locator system and said pulse generator, and means for correlating the reply signals generated in said coder circuit and the echo pulses received by said radar locator system.

8. In combination, a radar locator system, a pulse generator operable to produce pulse transmissions comprising one or more time spaced pulses occurring in any of a plurality of fixed time positions to form a plurality of different pulse code patterns, receiving means for receiving said pulse transmissions, a coder circuit in said receiving means responsive to the number and time position of said pulses to generate a reply signal having a time delay dependent upon the pattern of said pulse transmissions, means for synchronizing the operation of said radar locator system and said pulse generator, means for correlating the reply signals generated in said coder circuit and the echo pulses received by radar locator system.

9. In combination, a pulse generator operable to produce pulse transmissions comprising one or more time spaced pulses occurring in any of a plurality of fixed time positions to form a plurality of different pulse code patterns which vary from pulse transmission to pulse transmission, a receiving means for receiving each of said pulse transmissions, a coder circuit in said receiving means responsive to the number and time position of said pulses to generate a reply signal having a characteristic dependent upon the pattern of the received pulse transmissions, a second receiving means for receiving said reply signal, and utilization means coupled to said second receiver for utilizing the output derived therefrom.

10. In combination, a pulse generator located at a first point and operable to produce pulse transmissions comprising one or more time spaced pulses occurring in any of a plurality of fixed time positions to form a plurality of different code patterns, a receiving system located at a second point for receiving said pulse transmissions, a coder circuit in said receiving system operative responsive to the number and time position of said pulses to generate a coded reply signal having signal characteristics depending upon the pattern of said pulse transmissions, a reply signal receiver at first point, a second coder circuit at said first point coupled to said reply signal receiver and responsive to the code pattern transmitted by said pulse generator to render said reply signal receiver sensitive to receive the reply signal.

11. In combination, a pulse generator located at a first point and operable to produce pulse transmissions comprising one or more time spaced pulses occurring in any of a plurality of fixed time positions to form a plurality of different code patterns, a receiving system located at a second point for receiving said pulse transmissions, a coder circuit in said receiving system operative responsive to the number and time position of the received pulses to generate a coded reply signal having signal characteristics depending upon the pattern of said pulse transmissions, a reply signal receiver at said first point, a second coder circuit at said first point coupled to said reply signal receiver and responsive to the code pattern transmitted by said pulse generator to render said reply signal receiver sensitive to receive the reply signal, and utilization means coupled to the output of said reply signal receiver for utilizing the output derived therefrom.

12. In combination, a radio echo detection system comprising a transmitter for transmitting periodic energy pulses, a receiver for receiving said periodic energy pulses after reflection from remote objects and a cathode ray indicator for indicating in two space coordinates the position of the various objects detected by the system, a recognition system synchronized with said radar system and comprising an interrogator pulse transmitter at the radar site for periodically transmitting into space one or more time spaced pulses occurring in any of a plurality of fixed time positions to form a plurality of different code patterns, a recognition receiver system adapted for installation aboard friendly objects for receiving said pulse patterns, a coder circuit in said recognition receiver system for generating a reply signal having signal characteristics in dependency upon the pulse pattern received, a reply receiver at the radar site, a second coder circuit at the radar site coupled to said reply receiver and responsive to the code pattern transmitted by said pulse generator to render said reply receiver sensitive to receive the reply signal, and means for applying the output of the reply receiver to said cathode ray indicator.

13. In combination, a radio echo detection system comprising a transmitter for transmitting periodic energy pulses, a receiver for receiving said periodic energy pulses after reflections from remote objects and a cathode ray indicator for indicating in two space coordinates the position of the various objects detected by the system, a recognition system synchronized with said radar system and comprising an interrogator pulse transmitter at the radar site for periodically transmitting into space one or more time spaced pulses occurring in any of a plurality of fixed time positions to form a plurality of different code patterns, a recognition receiver system adapted for installation aboard friendly objects for receiving said pulse patterns, a coder circuit in said recognition receiver system for generating a reply signal having a carrier frequency in dependency upon the pulse pattern received, a reply receiver at the radar site, a second coder circuit at the radar site coupled to said reply receiver and responsive to the code pattern transmitted by said pulse generator to tune said reply receiver to receive the reply signal.

14. In combination, a radio echo detection system comprising a transmitter for transmitting periodic energy pulses, a receiver for receiving said periodic energy pulses after reflections from remote objects and a cathode ray indicator for indicating in two space coordinates the position of the various objects detected by the system, a recognition system synchronized with said radar system and comprising an interrogator pulse transmitter at the radar site for periodically transmitting into space one or more time spaced pulses occurring in any of a plurality of fixed time positions to form a plurality of different code patterns, a recognition receiver system adapted for installation aboard friendly objects for receiving said pulse patterns, a coder circuit in said recognition receiver system for generating a reply signal having a carrier frequency in dependency upon the pulse pattern received, a reply receiver at the radar site, a second coder circuit at the radar site coupled to said reply receiver and responsive to the code pattern transmitted by said pulse generator to tune said reply receiver to receive the reply signal, and means for applying the output of the reply receiver to said cathode ray indicator.

15. In combination, a pulse generator at a first point operable to produce pulse transmissions comprising one or more time spaced pulses occurring in any of a plurality of fixed time positions to form a plurality of different pulse code patterns, receiving means at a second point for receiving said pulse transmissions, and a coder circuit in said receiving means responsive to the number and time position of said pulses to generate a reply signal having a frequency dependent upon the pattern of said pulse transmissions, a reply signal receiver at said first point, a second coder circuit at said first point coupled to said reply signal receiver and responsive to the code pattern transmitted by said pulse generator to render said reply signal receiver sensitive to receive the reply signal.

16. In combination, a pulse generator at a first point operable to produce pulse transmissions comprising one or more time spaced pulses occurring in any of a plurality of fixed time positions to form a plurality of different pulse code patterns, receiving means at a second point for receiving said pulse transmissions, and a coder circuit in said receiving means responsive to the number and time position of said pulses to generate a reply signal having a frequency dependent upon the pattern of said pulse transmissions, a reply signal receiver at said first point, a second coder circuit at said first point coupled to said reply signal receiver and responsive to the code pattern transmitted by said pulse generator to render said reply signal receiver sensitive to receive the reply signal, and utilization means coupled to the output of said reply signal receiver for utilizing the output derived therefrom.

17. In combination, a pulse generator located at a first point and operable to produce pulse transmissions comprising one or more time spaced pulses occurring in any of a plurality of fixed time positions to form a plurality of different code patterns, a receiving system located at a second point for receiving said pulse transmissions, a coder circuit in said receiving system operative responsive to the number and time position of said pulses to generate a coded reply signal having signal characteristics depending upon the pattern of said pulse transmissions, a reply signal receiver at said first point, a second coder circuit at said first point coupled to said reply signal receiver and responsive to the code pattern transmitted by said pulse generator to render said reply signal receiver sensitive to receive the reply signal, and means for randomly varying the reply code for any given received transmitted code pattern and for synchronously varying the reply receiver signal sensitivity characteristics.

18. In combination, a pulse radar locator system having a pulse transmitter, a rotatable directional antenna, echo pulse receiving means, and a viewing apparatus, an interrogation pulse generator synchronized with said pulse transmitter and operable to produce pulse transmissions comprising one or more time spaced pulses occurring in any of a plurality of fixed time positions to form a plurality of different interrogation pulse patterns, a rotatable directional interrogation transmission antenna, means for synchronizing the rotation of said antennas, a first coder circuit coupled to said interrogation generator for generating a voltage dependent upon the interrogation pattern transmitted, a remote transponder, a receiver for receiving pulses generated by said transponder, a first time delay circuit having a time delay dependent upon the voltage generated in said first coder circuit and coupled to said receiver and said coder circuit, means coupled to said first time delay circuit for introducing the output from said first time delay circuit into the viewing apparatus of said radar locator system, said transponder comprising a receiver tuned to the interrogation transmitter, a second coder circuit identical to the first coder circuit and coupled to said last receiver for generating a voltage dependent upon the interrogation code received, a second time delay circuit having a time delay complementary to that of said first time delay circuit and coupled to said second coder circuit, a generator coupled to said second coder circuit and triggered thereby, and a transponder transmitter coupled to said last named generator for transmitting the pulses generated therein.

* * * * *